United States Patent Office 3,704,156
Patented Nov. 28, 1972

3,704,156

CATALYST SOLUTION FOR ELECTROLESS PLATING ON NONCONDUCTORS

Edward F. Foley, Jr., Shan-Pu Tsai, and William A. Zatorsky, Painesville, Ohio, assignors to E. I. du Pont de Nemours and Company, Wilmington, Del.

No Drawing. Filed July 13, 1970, Ser. No. 54,571
Int. Cl. B44d *1/18*
U.S. Cl. 117—47 A 14 Claims

ABSTRACT OF THE DISCLOSURE

A catalyst solution for use in electroless plating on nonconductors is prepared by dissolving a palladium salt in a solution of a complexing acid which forms monodentate ligands. The solution can be prepared using a palladium salt and a complexing acid such as acetic acid, monochloracetic acid, bromoacetic acid, dichloroacetic acid, trichloroacetic acid, glycollic acid, phosphoric acid and 1,3,5-pentanetricarboxylic acid.

BACKGROUND OF THE INVENTION (1) Field of the invention

This invention relates to a catalyst solution for use in electroless plating on nonconductors and more particularly to a catalyst solution prepared by dissolving a palladium salt in a solution of a complexing acid which forms monodentate ligands.

(2) Description of the prior art

In the process of metalizing nonconducting substrates by the use of an electroless metal plating bath, it is well known in the prior art to first catalyze or sensitize the surface by depositing on the surface of the substrate a noble metal such as palladium for the purpose of localizing the plating action of the electroless plating bath, initiating the reduction on the surface and insuring complete coverage of the substrate with the metal being deposited.

This catalyzation step is usually carried out by using a solution of palladium chloride in hydrochloric acid solution either preceded by the use of a reducing agent solution such as a stannous chloride solution or followed by the use of a solution of a reducing agent such as a solution of sodium hypophosphite or a solution of dimethylamine borane. (Reference: Goldie, William, Metallic Coating of Plastics, Middlesex, England: Electrochemical Publications Limited, 1968, pp. 39–52.) Other solutions have been used such as a colloidal dispersion of a catalytic metal as described in U.S. Pat. No. 3,011,920, Charles R. Shipley, Jr. (Dec. 5, 1961), or an alkaline hydroxide complex of a catalytic metal as described in U.S. Patent No. 2,872,359, Edward B. Saubestre (Feb. 3, 1959).

It is also known in the prior art that effectiveness of the catalyzing solution can be improved by decreasing the hydrogen ion concentration of the solution or by increasing the temperature at which the catalyzing solution is used. Further, it is known that nonconducting substrates, particularly the surfaces of organic polymers such as acrylonitrile-butadiene-styrene and polypropylene, are frequently unevenly catalyzed by the prior art solutions which produces voids in the metallic plate or areas on which metal from the electroless plating bath does not deposit. In attempting to increase the activity of catalyst solutions by either decreasing the hydrogen ion concentration (raising the pH of the catalyst solution) or increasing the temperature at which the bath is used, or both, it is known that there is a limit in these two procedures beyond which the baths become unstable and the active ingredients precipitate from the baths, thus reducing the effectiveness of the treatment.

SUMMARY OF THE INVENTION

It has been found that an improved catalyst solution can be prepared by dissolving a palladium salt in a solution of a complexing acid, other than hydrochloric acid, which forms monodentate ligands. Useful complexing acids include acetic acid, monochloroacetic acid, bromoacetic acid, dichloroacetic acid, trichloroacetic acid, glycollic acid, phosphoric acid and 1,3,5-pentanetricarboxylic acid. Acids, which form bidentate ligands and which form tight complexes with palladium such as oxalic acid, malonic acid and citric acid, produce solutions having little or no catalytic activity.

It is an object of this invention to provide a catalyst solution for use in electroless plating on nonconductors. Another object is to provide an improved electroless plating process using this catalyst solution. A further object is to provide improved plating on nonconductors. Other objects will become apparent from the detailed description given hereinafter. It is intended that this description and specific examples merely indicate preferred embodiments thereof and do not limit this invention since various changes and modifications within the scope of this invention will become apparent to those skilled in the art.

DESCRIPTION OF THE PREFERRED EMBODIMENTS

In the metalizing of a nonconductor such as acrylonitrile-butadiene-styrene, polypropylene or other polymeric material, the hydrophobic surface or surfaces of the nonconductor are first converted to the hydrophilic state by immersing the substrate surface in an acid oxidizing solution to condition or etch the surface. U.S. Patent No. 3,471,313, Saubestre et al., patented Oct. 7, 1969, discloses numerous oxidizing solutions useful for this purpose. There are also numerous commercial oxidizing solutions offered under proprietary names for this use. After immersion in the oxidizing solution, the nonconductor is removed from the bath and the surface rinsed with water to remove excess oxidizing solution.

The surface of the nonconductor is then catalyzed by immersing the surface in a catalyst solution of the present invention containing from about 0.3 to about 3.4 millimole per liter of a palladium salt and from about 0.01 to about 0.25 mole per liter of a complexing acid which forms monodentate ligands with the preferred range being from about 0.3 to about 1.1 millimole of a palladium salt and from about 0.02 to about 0.10 mole per liter of the complexing acid. The catalyst solution can be prepared by dissolving a palladium salt such as palladium chloride, palladium acetate or palladium nitrate in a solution of a complexing acid such as acetic acid, monochloroacetic acid, bromoacetic acid, dichloroacetic acid, trichloroacetic acid, glycollic acid, phosphoric acid and 1,3,5-pentanetricarboxylic acid. Catalyzing the substrate surface can be accomplished by immersing the surface in the catalyst solution for about 1 to about 3 minutes at a temperature of from about 65° to about 150° F.

The catalyzed surface, after removal from the catalyst solution and rinsing with water to remove excess catalyst solution, can be activated or accelerated by immersion in a solution of a reducing agent which reduces the palladium ions on the substrate to the metallic state, palladium metal. For example, one of the following reducing solutions can be used in this invention:

| Reducing solution A: | G./l. |
|---|---|
| Sodium hypophosphite monohydrate | 30 |
| Water to make 1 l. | |
| Reducing solution B: | |
| Dimethylamine borane | 5 |
| Water to make 1 l. | |

The surface of the reduced substrate can then be rinsed with water to remove excess reducing solution. Alternatively, the substrate can be immersed in a reducing solution first, rinsed with water and then immersed in the catalyst solution. The following reducing solution is suitable for use before the catalyst solution in the present invention:

| Reducing solution C: | G./l. |
|---|---|
| Stannous chloride | 30 |
| Hydrochloric acid | 40 |
| Water to make 1 l. | |

If desired, the catalyzed surface after rinsing with water can be immersed directly in the electroless metal plating bath without prior treatment with a reducing solution, in which case, the reducing agent in the electroless metal plating bath will reduce the palladium ions on the substrate surface to palladium metal which will in turn catalyze deposition of metal from the electroless plating bath onto the surface of the catalyzed substrate.

One of the following electroless metal plating baths can be used in the present invention:

| Electroless copper bath: | G./l. |
|---|---|
| Copper sulfate pentahydrate | 20 |
| Formaldehyde 37% | 100 |
| Caustic soda | 12 |
| Sodium carbonate | 5 |
| Rochell salts tetrahydrate | 60 |
| Water to make 1 l. | |

For use at room temperature.

| Electroless nickel bath AC: | G./l. |
|---|---|
| Nickel (as nickel sulfate) | 5 |
| Sodium acetate | 5 |
| Sodium citrate dihydrate | 5 |
| Sodium hypophosphite monohydrate | 20 |
| Water to make 1 l. | |

For use at a temperature of 130° to 155° F. and a pH of 4.5 to 5.

Or the electroless nickel bath of U.S. Pat. No. 3,488,-166, Kovac et al., patented Jan. 6, 1970, as shown below:

| Electroless nickel bath of Kovac et al.: | G./l. |
|---|---|
| Nickel sulfate hexahydrate | 26.3 |
| Ammonium chloride | 53.5 |
| Sodium hypophosphite monohydrate | 21.2 |
| Water to make 1 l. | |

For use at room temperature. After pH adjusted to 9 with NaOH.

There are also a number of commercial electroless nickel baths offered under proprietary names which may be used.

While the common practice is to refer to the deposits from the hypophosphite containing electroless nickel baths above as "nickel," it is well known that the deposits are really a nickel phosphorous alloy. The term "nickel" as used in this invention is understood to refer to this nickel phosphorous alloy deposit.

Since the solutions used in the above treatment cycle are generally not compatible with each other, it is desirable that the substrate surface be rinsed with water between each step to avoid contaminating the solutions used in the next and subsequent steps with the ingredients in the solution used in the preceding step.

For a fuller understanding of the nature and objects of this invention, reference may be made to the following examples. These examples are given merely to illustrate the invention and are not to be construed in a limiting sense. All quantities, proportions and percentages are by weight and all references to temperature are to ° F. unless otherwise indicated.

Example 1.—A series of catalyst solutions are prepared by dissolving 0.2 g./l. of $PdCl_2$ (palladium chloride) in the various aqueous solutions of complexing acids shown in Table 1. Where necessary, the pH is adjusted with NaOH (sodium hydroxide) solution. The concentrations of acids used in the catalyst solutions and the pH of the solutions are shown in Table 1.

Effectiveness of each catalyst solution is determined by using the solution in the plating of injection molded PP (polypropylene) parts following the nickel plating sequence described below and then visually observing the percentage of the surface of each part which is covered with adherent metal from the electroless nickel bath. Results of these tests are shown in Table 1 and are reported as percent substrate surface covered with metal.

Nickel plating sequence:

(1) Etch in an oxidizing solution.
(2) Cold water rinse.
(3) Catalyze by immersion in one of the various catalyst solutions of Table 1.
(4) Cold water rinse.
(5) Immerse in reducing solution B.
(6) Cold water rinse.
(7) Metalize in a commercial electroless nickel bath for 2 minutes at 85° F.

TABLE 1

| | Concentration of complexing acid in catalyst solution (m.) [1] | pH [2] | Percent substrate surface covered |
|---|---|---|---|
| Complexing acid: | | | |
| Monochloroacetic acid | 0.10 | 3 | 100 |
| | 0.055 | 2.5 | 100 |
| | 0.055 | 3 | 100 |
| | 0.03 | 2.4 | 100 |
| | 0.025 | 2.5 | 100 |
| | 0.01 | 2.5 | 100 |
| Dichloroacetic acid | 0.05 | 3 | 100 |
| Glycollic acid | 0.05 | 3 | 100 |
| Monobromoacetic acid | 0.05 | 3 | 90 |
| Trichloroacetic acid | 0.05 | 3 | 90 |
| Phosphoric acid | 0.25 | 3 | 100 |
| 1,3,5,-pentanetricarboxylic acid | 0.05 | 3 | 90 |
| Acetic acid | 0.017 | 3 | 100 |
| | 0.0332 | 3 | 100 |
| | 0.05 | 3 | 100 |
| | 0.08 | 3 | 70 |
| | 0.17 | 3 | 70 |
| Oxalic acid | 0.05 | 3 | 0 |
| Malonic acid | 0.05 | 3 | 0 |
| Citric acid | 0.05 | 3 | 0 |
| Hydrochloric acid | 0.05 | 3 | 0 |
| Aminoacetic acid | 0.05 | 3 | 0 |

[1] All catalyst solutions contain 0.2 g./l. $PdCl_2$.
[2] pH of catalyst solution adjusted with NaOH.

Example 2.—Effect of pH on the catalyst solution activity is determined by preparing catalyst solutions with acetic acid, dichloroacetic acid, glycollic acid and phosphoric acid, the complexing acids used in this invention as well as hydrochloric acid, the complexing acid used in the prior art. Each solution has the same $PdCl_2$ concentration, the same molar concentration of acid. Each catalyst solution is adjusted to the pH values shown in Table 2 by addition of NaOH solution and then used to plate injection molded PP parts following the plating sequence and conditions given in Example 1. Percentage of the substrate surface covered with nickel obtained with each catalyst solution is determined by visual observation and is recorded in Table 2.

TABLE 2

Effect of pH on catalyst solution activity

| | Percent substrate surface covered using a catalyst solution having the indicated pH | | | | | | | | | | |
|---|---|---|---|---|---|---|---|---|---|---|---|
| pH | 1.8 | 2.0 | 2.5 | 2.9 | 3.0 | 3.5 | 4.0 | 5.0 | 6.0 | 7.5 | 10.5 |
| Complexing acid: | | | | | | | | | | | |
| Acetic acid | | | 0 | | 95 | | 100 | | 100 | | |
| Dichloroacetic acid | 0 | 0 | 5 | | 100 | 100 | | | | | |
| Glycollic acid | | | | 5 | | | 90 | 100 | | 5 | |
| Phosphoric acid | | | | | 95 | | 100 | 100 | 40 | | 0 |
| Hydrochloric acid | | | | | 0 | | 70 | 90 | (1) | | |

(1) Precipitate.

Example 3.—This example demonstrates catalyst solution stability at different pH's. Effect of pH on catalyst solution stability is determined by increasing the pH of the catalyst solutions by adding NaOH solution and measuring the pH at which a precipitate begins to form in the catalyst solution at 140° F. All of the solutions contain 0.2 g./l. of $PdCl_2$ and 0.05 m./l. of the indicated complexing acid. The pH at which a precipitate begins to form in each catalyst solution is shown in Table 3. This table also shows results obtained as percent substrate covered with nickel when specific catalyst solutions are used at a pH of 3 and 140° F. in the nickel plating sequence in Example 1.

TABLE 3

Stability of a catalyst solution at various pH's

| | pH at which catalyst solutions precipitate at 140° F. | Percent of substrate covered with nickel |
|---|---|---|
| Complexing acid: | | |
| Iodoacetic acid | 2.3 | |
| Nitric acid | 3.1 | |
| Trichloroacetic acid | 3.15 | 90 |
| Sodium bisulfate | 3.25 | |
| Dichloroacetic acid | 3.3 | 100 |
| Bromoacetic acid | 4.0 | 90 |
| Monochloroacetic acid | 4.1 | 100 |
| Acetic acid | 5.1 | |
| Glycollic acid | 10.8 | |
| Hydrochloric acid | 5.1 | 0 |
| Oxalic acid | 8.9 | 0 |
| Succinic acid | 9.5 | 0 |

Example 4.—This example demonstrates use of a catalyst solution of this invention in a plating sequence where a stannous chloride reducing solution is used before the catalyst solution.

The following sequence of steps are used to metalize a PP panel in an electroless nickel bath.

(1) Etch surface of panel in an oxidizing solution at 175° F. for 15 minutes followed by cold water rinse.
(2) Sensitize surface of panel in reducing solution C at room temperature for 1 minute followed by cold water rinse.
(3) Catalyze surface of panel in catalyst solution containing 0.2 g./l. $PdCl_2$ in 0.05 m. acetic acid, pH adjusted to pH 3.0 with caustic soda, 1 minute at room temperature followed by cold water rinse.
(4) Metalize surface of panel in a commercial electroless nickel bath at room temperature for 6 minutes.

Visual observations show surface of the panel is completely 100% covered with an adherent nickel deposit at the end of this plating sequence.

Example 5.—This example demonstrates effect of Pd ion (palladium ion) concentration in catalyst solution. Activity of the catalyst solution increases as the concentration of Pd ion is increased over the range of about 0.03 g./l. Pd ion to about 0.36 g./l. Pd ion (about 0.05 g./l. $PdCl_2$ to about 0.6 g./l. of $PdCl_2$). Increase in activity as the concentration is increased above 0.12 g./l. Pd ion (0.2 g./l. $PdCl_2$) is slight. Due to the high cost of palladium salts, the optimum concentration range of Pd ion is considered to be between 0.03 g./l. Pd ion and 0.12 g./l. Pd ion. However, if additional activity is required, some advantage can be gained by increasing the concentration of Pd ion above 0.12 g./l.

Example 6.—Injection molded PP and injection molded ABS (acrylonitrile-butadiene-styrene) parts are metalized using the plating sequence described in Example 1. The catalyst solution used contains 0.2 g./l. $PdCl_2$ and 0.05 m. monochloroacetic acid. In place of the electroless nickel bath used in Example 1, the electroless copper bath described above is used to metalize the parts. Visual observations show all of the parts are 100% covered with an adherent coating of metallic copper.

Example 7.—Injection molded PP and ABS parts are plated with a smooth adherent nickel coating using both of the plating sequences given below in conjunction with electroles nickel bath AC described above.

Plating sequence 1:

(1) Etch in an oxidizing solution.
(2) Water rinse.
(3) Immerse in catalyst solution containing 0.2 g./l. $PdCl_2$ in 0.05 m. monochloroacetic acid.
(4) Water rinse.
(5) Immerse in reducing solution B.
(6) Water rinse.
(7) Metalize in electroless nickel bath AC at 135–140° F.

Plating sequence 2:

(1) Etch in an oxidizing solution.
(2) Water rinse.
(3) Immerse in catalyst solution containing 0.2 g./l. $PdCl_2$ in 0.05 m. monochloroacetic acid.
(4) Water rinse.
(5) Metalize in electroless nickel bath AC at 145–155° F.

Visual observations of the plated parts indicate 100% of the surface of both ABS and PP injection molded parts are covered with electroless nickel using either plating sequence 1 or plating sequence 2 shown above.

Example 8.—This example demonstrates use of palladium salts other than $PdCl_2$ in the catalyst solution. Catalyst solutions prepared by dissolving 0.26 g. $Pd(NO_3)_2$ (0.12 g. Pd ion) in 0.05 m. monochloroacetic acid and by dissolving 0.25 g. $Pd(Ac)_2$ (palladium acetate) (0.12 g. Pd ion) in 0.05 m. monochloroacetic acid are used in the plating sequence given in Example 1 to metalize the surface of injection molded PP parts with a commercial electroless nickel bath. Visual observation shows the plated parts are completely covered with an adherent conductive nickel deposit using either of these catalyst solutions.

Example 9.—Pieces of glazed ceramic, unglazed ceramic and phenolic printed circuit board are metalized with nickel using the nickel plating sequence given in Example 1 above. Catalyst solution used in this sequence contains 0.2 g./l. $PdCl_2$ dissolved in 0.05 m. monochloroacetic acid solution in which pH is adjusted to 2.9 with NaOH solution. Visual observations show the surfaces of the glazed and unglazed ceramic and the printed circuit board all are 100% covered with nickel after plating with a commercial electroless nickel bath.

Example 10.—Injection molded ABS parts are metalized using the plating sequence described in Example 1. The catalyst solution used contains 0.2 g./l. $PdCl_2$ and 0.05 m. monochloroacetic acid. In place of the electroless nickel bath used in Example 1, the electroless nickel bath of Kovac et al. described above is used to metalize the parts. Visual observations show all of the parts are 100% covered with an adherent coating of metallic nickel.

Nonconductors which can be used in this invention include inorganic substrates such as glasses, ceramics and the like and organic substrates such as polypropylene, polyethylene, other polyolefins, mixed olefin polymers, polystyrene, polyacrylonitrile, polyvinyl chloride, polyvinylidene chloride, other vinyl polymers, phenolformaldehyde, urea formaldehyde, other formaldehyde polymers, polymethylmethacrylate, methyl methacrylate-styrene copolymers, other acrylic polymers, acrylonitrile-butadiene-styrene polymers, polysulfone polymers and the like.

It is to be understood that although the invention has been described with specific reference to particular embodiments thereof, it is not to be so limited, since changes and alterations therein may be made which are within the full intended scope of this invention as defined by the appended claims.

What is claimed is:

1. A catalyst solution having enhanced activity in the electroless metal plating of a nonconductor, which solution comprises a palladium salt dissolved in a solution of between about 0.01–0.25 mole per liter of a monodentate ligand forming complexing acid other than hydrochloric acid, said solution being thereby adapted for catalyzing said nonconductor without containing hydrochloric acid.

2. The catalyst solution of claim 1 wherein the palladium salt is selected from the group consisting of palladium chloride, palladium acetate and palladium nitrate and the complexing acid is selected from the group consisting of acetic acid, monochloroacetic acid, bromoacetic acid, dichloroacetic acid, trichloroacetic acid, glycollic acid, phosphoric acid and 1,3,5-pentanetricarboxylic acid.

3. The catalyst solution of claim 1 wherein the palladium salt is selected from the group consisting of palladium chloride, palladium acetate and palladium nitrate and the complexing acid is selected from the group consisting of acetic acid and monochloroacetic acid.

4. The catalyst solution of claim 1 wherein from about 0.3 to about 3.4 millimoles per liter of a palladium salt are present with the complexing acid.

5. The catalyst solution of claim 4 wherein the palladium salt is palladium chloride and the complexing acid is selected from the group consisting of acetic acid and monochloroacetic acid.

6. The catalyst solution of claim 4 wherein the palladium salt is palladium nitrate and the complexing acid is selected from the group consisting of acetic acid and monochloroacetic acid.

7. The catalyst solution of claim 4 wherein the palladium salt is palladium acetate and the complexing acid is selected from the group consisting of acetic acid and monochloroacetic acid.

8. A process for electroless metal plating a nonconductor which comprises the steps:

(a) immersing a nonconductor substrate surface in an oxidizing solution to convert the surface to a hydrophilic state, then (b) rinsing the surface with water to remove excess oxidizing solution, thereafter (c) immersing the surface in a catalyst solution maintained at a temperature not above about 65° C., which solution comprises a palladium salt dissolved in a solution of between about 0.01–0.25 mole per liter of a monodentate ligand forming complexing acid other than hydrochloric acid to absorb palladium ions on the surface, said solution being thereby adapted for catalyzing said surface without containing hydrochloric acid, then (d) rinsing the surface with water to remove excess catalyst solution, then (e) immersing the surface in a reducing solution to reduce the palladium ions on the surface to palladium metal, thereafter (f) rinsing the surface with water to remove excess reducing solution and then (g) immersing the surface in an electroless metal plating bath to deposit metal from the bath onto the surface.

9. The process of claim 8 wherein step (e) and step (f) precede step (c).

10. The process of claim 8 wherein step (e) and step (f) are absent.

11. The process of claim 8 wherein the palladium salt in the catalyst solution in step (c) is selected from the group consisting of palladium chloride, palladium acetate and palladium nitrate and the complexing acid is selected from the group consisting of acetic acid, monochloroacetic acid, bromoacetic acid, dichloroacetic acid, trichloroacetic acid, glycollic acid, phosphoric acid and 1,3,5-pentanetricarboxylic acid.

12. The process of claim 8 wherein from about 0.3 to about 3.4 millimoles per liter of a palladium salt are present with the complexing acid in the catalyst solution in step (c).

13. The process of claim 8 wherein the palladium salt is palladium chloride and the complexing acid is selected from the group consisting of acetic acid and monochloroacetic acid in the catalyst solution used in step (c).

14. The process of claim 8 wherein the palladium salt is palladium nitrate and the complexing acid is selected from the group consisting of acetic acid and monochloroacetic acid in the catalyst solution used in step (c).

References Cited

UNITED STATES PATENTS

| | | | |
|---|---|---|---|
| 3,423,226 | 1/1969 | Jensen | 117—160 X |
| 3,515,649 | 6/1970 | Hepfer | 117—47 X |
| 3,561,995 | 2/1971 | Wu et al. | 117—47 |
| 3,437,507 | 4/1969 | Jensen | 117—160 X |
| 3,506,462 | 4/1970 | Oda et al. | 117—47 X |
| 3,507,681 | 4/1970 | Cooper | 117—160 X |

RALPH S. KENDALL, Primary Examiner

C. WESTON, Assistant Examiner

U.S. Cl. X.R.

106—1; 117—47 R, 160 R, 213